US009971043B2

(12) United States Patent
Ishida (10) Patent No.: US 9,971,043 B2
(45) Date of Patent: May 15, 2018

(54) RADIATION DETECTION APPARATUS, RADIATION IMAGING SYSTEM, AND MANUFACTURING METHOD

(71) Applicant: CANON KABUSHIKI KAISHA, Tokyo (JP)

(72) Inventor: Yohei Ishida, Honjo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 183 days.

(21) Appl. No.: 15/057,199

(22) Filed: Mar. 1, 2016

(65) Prior Publication Data

US 2016/0274250 A1    Sep. 22, 2016

(30) Foreign Application Priority Data

Mar. 18, 2015  (JP) .................................. 2015-055354

(51) Int. Cl.
*H05G 1/64*    (2006.01)
*G01T 1/202*   (2006.01)

(52) U.S. Cl.
CPC .................................. *G01T 1/202* (2013.01)

(58) Field of Classification Search
CPC .............................. G01T 1/2018; G01T 1/202
See application file for complete search history.

(56) References Cited

U.S. PATENT DOCUMENTS

| 7,019,302 B2 | 3/2006 | Takabayashi et al. ... 250/370.11 |
| 7,019,303 B2 | 3/2006 | Homme et al. .......... 250/370.11 |
| 7,372,037 B2 * | 5/2008 | Mori .................... H01L 27/1463 250/370.11 |
| 8,648,312 B2 | 2/2014 | Ichimura et al. ............. 250/367 |
| 8,653,465 B2 | 2/2014 | Nagano et al. ................ 250/369 |
| 8,704,185 B2 | 4/2014 | Ishida et al. .................. 250/369 |
| 8,957,383 B2 | 2/2015 | Sasaki et al. ............. 250/361 R |
| 9,006,665 B2 | 4/2015 | Nagano et al. ....... G01T 1/2002 |
| 9,054,012 B2 | 6/2015 | Nomura et al. .. H01L 27/14685 |
| 2003/0015665 A1 | 1/2003 | Homme et al. .......... 250/370.11 |
| 2003/0173493 A1 | 9/2003 | Homme et al. ............... 250/200 |
| 2004/0089813 A1 | 5/2004 | Takabayashi et al. ... 250/370.11 |
| 2012/0219115 A1 | 8/2012 | Okada et al. ................... 378/62 |
| 2013/0153775 A1 | 6/2013 | Nomura et al. ............. 250/366 |

(Continued)

FOREIGN PATENT DOCUMENTS

CN    1869732 A    11/2006
CN    103454668 A    12/2013

(Continued)

OTHER PUBLICATIONS

Office Action dated Jun. 28, 2017, in counterpart P.R. China patent application 201610147423.5, with translation.

*Primary Examiner* — Courtney Thomas
(74) *Attorney, Agent, or Firm* — Fitzpatrick Cella Harper and Scinto (57) ABSTRACT

A radiation detection apparatus includes a sensor base, a sensor substrate supported by the sensor base and configured to output signals from a plurality of pixels for radiation detection, a peripheral member arranged on a periphery of a side surface of the sensor substrate separately from the sensor substrate, supported by the sensor base, and configured not to output the signal for the radiation detection, and a scintillator layer configured to continuously cover the sensor substrate and the peripheral member.

21 Claims, 5 Drawing Sheets

(56) References Cited

U.S. PATENT DOCUMENTS

| | | | |
|---|---|---|---|
| 2013/0168559 A1 | 7/2013 | Saruta et al. | 250/366 |
| 2013/0308755 A1 | 11/2013 | Ishida et al. | 378/62 |
| 2013/0322598 A1 | 12/2013 | Saruta et al. | 378/62 |
| 2013/0341516 A1 | 12/2013 | Ishida et al. | 250/363.02 |
| 2014/0008749 A1 | 1/2014 | Nomura et al. | 257/432 |
| 2014/0042327 A1* | 2/2014 | Inoue | G01T 1/2002 250/362 |
| 2014/0091225 A1 | 4/2014 | Sasaki et al. | 250/366 |

FOREIGN PATENT DOCUMENTS

| | | |
|---|---|---|
| CN | 103515404 A | 1/2014 |
| CN | 103531600 A | 1/2014 |
| JP | 2002-048870 | 2/2002 |
| JP | 4447752 | 4/2010 |

* cited by examiner

RADIATION DETECTION APPARATUS, RADIATION IMAGING SYSTEM, AND MANUFACTURING METHOD

BACKGROUND OF THE INVENTION

Field of the Invention

The present invention relates to a radiation detection apparatus used for radiation detection, a radiation imaging system, and a manufacturing method.

Description of the Related Art

There exists a radiation detection apparatus including a scintillator layer with a columnar crystal formed on a sensor substrate. Such a radiation detection apparatus is required to improve the use efficiency by efficiently absorbing emitted radiation while maintaining sharpness of imaging. In other words, it is necessary to improve both DQE (Detective Quanta Efficiency) and MTF (Modulation Transfer Function) of a radiation detection element.

Japanese Patent Laid-Open No. 2002-48870 discloses a radiation detector in which a plurality of imaging substrates each having a scintillator are arranged. In Japanese Patent Laid-Open No. 2002-48870, the scintillator layer is formed on each substrate such that it extends up to the boundary to adjacent substrates when the imaging substrates are arranged, and the substrates are arranged to prevent a decrease in the resolution and separation of the scintillators. Japanese Patent No. 4447752 discloses a radiation detector configured to prevent a decrease in the resolution and separation near the joints by forming a transparent film that covers a plurality of imaging substrates and forming a scintillator on the transparent film.

SUMMARY OF THE INVENTION

The present invention provides a radiation detection apparatus having a structure advantageous in improving MTF and DQE and preventing separation of a scintillator layer.

According to an aspect of the present invention, the present invention provides a radiation detection apparatus including, a sensor base, a sensor substrate supported by the sensor base and configured to output signals from a plurality of pixels for radiation detection, a peripheral member arranged on a periphery of a side surface of the sensor substrate separately from the sensor substrate, supported by the sensor base, and configured not to output the signal for the radiation detection, and a scintillator layer configured to continuously cover the sensor substrate and the peripheral member.

Further features of the present invention will become apparent from the following description of exemplary embodiments with reference to the attached drawings.

DESCRIPTION OF THE EMBODIMENTS

A radiation detection apparatus according to an embodiment of the present invention will now be described in detail with reference to the accompanying drawings. The radiation detection apparatus includes a sensor panel that detects radiation. The sensor panel is a device including a sensor substrate formed from photoelectric conversion elements arranged in a matrix and switching elements, and a scintillator that converts radiation into visible light. Note that in this specification, radiation includes not only X-rays but also electromagnetic waves such as α-rays, β-rays, and γ-rays.

<First Embodiment>

Figure 1A:
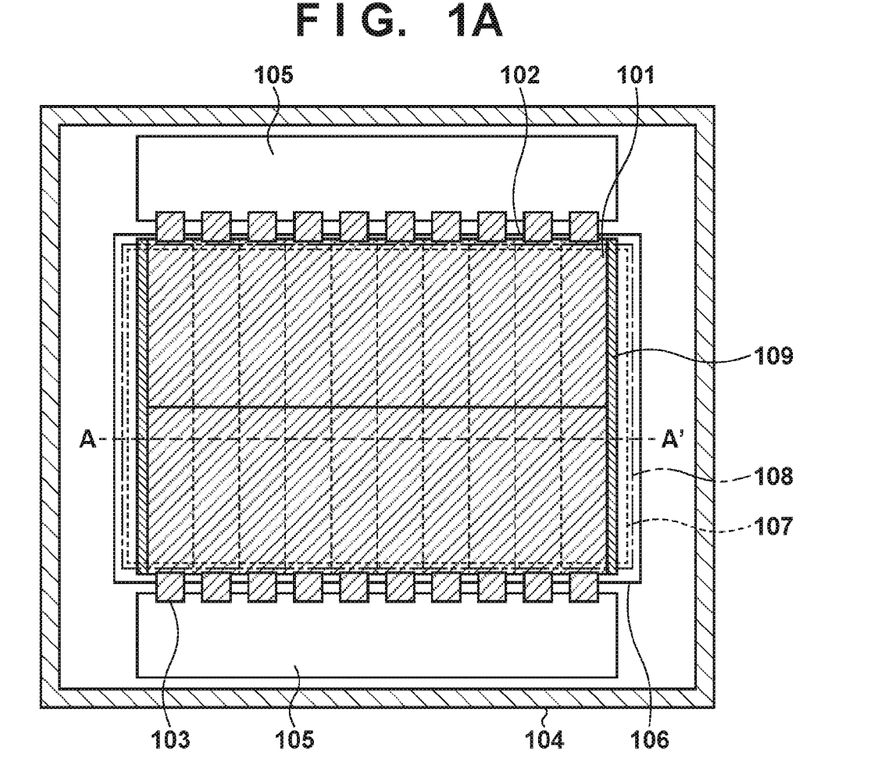
FIGS. 1A and 1B are a schematic top view and a schematic sectional view of a radiation detection apparatus according to an embodiment, respectively.
Figure 1B:
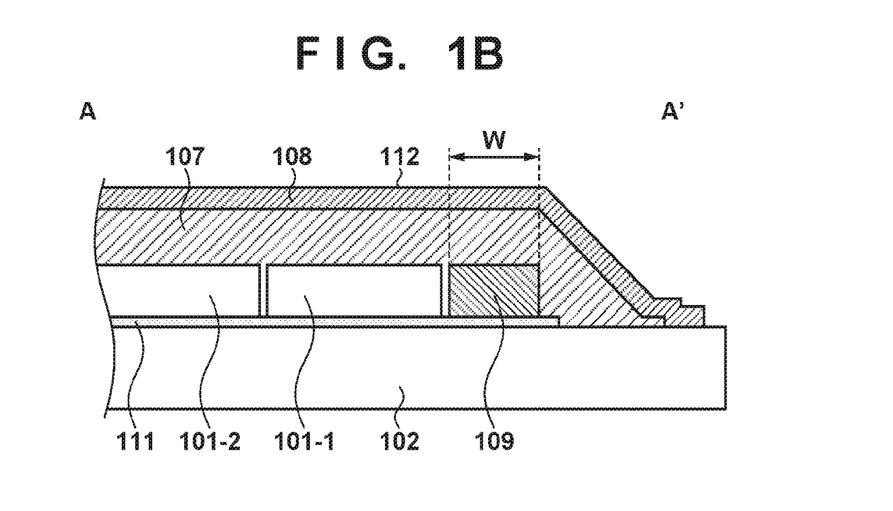

First, a radiation detection apparatus according to the embodiment will be described with reference to FIGS. 1A and 1B. CMOS sensors or sensors using amorphous silicon (a-Si) are arranged in a matrix on a sensor substrate 101. FIGS. 1A and 1B illustrate a radiation detection apparatus formed by arranging a plurality of sensor substrates 101 to form a wide screen. However, the sensor substrate 101 may include one sensor substrate. In a sensor panel, the sensor substrates 101 on which a plurality of CMOS sensors are arranged in a matrix are supported on a sensor base 102 via an adhesive layer. Each CMOS sensor includes a pixel including a photoelectric conversion element or a MOS transistor. The surface of the sensor panel is protected by a 5-μm thick scintillator protection layer made of polyimide. An external wiring 103 is connected to an external connection electrode provided on at least one side of each sensor substrate 101. A driving signal, an output signal, and the like are transmitted/received between the sensor substrate 101 and an electric circuit portion 105 via the external wiring 103. That is, signals from the plurality of pixels of the sensor panel are output via the external wirings 103.

A sectional view of the sensor panel of the radiation detection apparatus according to this embodiment taken along a line A-A' in FIG. 1A will be described next with reference to FIG. 1B. As the material of the scintillator layer of the sensor panel, for example, cesium iodide (to be referred to as CsI hereinafter) is used. A small amount of, for example, thallium (Tl), sodium (Na), or the like is added to CsI as an activator. When these materials are added in a small amount, the visible light emission characteristic of CsI is improved. For a scintillator including a plurality of columnar structures like CsI, for example, a material mainly containing an alkali halide can be used.

A peripheral member 109 is arranged on a periphery of a side surface of a sensor substrate. The peripheral member 109 is made of the same material (silicon) as the CMOS sensor. The sensor panel includes a plurality of sensor substrates 101-1, 101-2, . . . . The peripheral member 109 is arranged to be adjacent to a side surface of the sensor substrate 101-1. In a step of forming a scintillator layer 107, the peripheral member 109 can suppress a change in the film thickness of the scintillator layer caused by the step difference at the edge of the sensor substrate 101. As a result, a change in the film thickness of the scintillator layer at the edge of the sensor substrate 101 is suppressed, and a decrease in the output of the imaging signal at the edge of the sensor panel of the radiation detection apparatus is suppressed. The peripheral member 109 does not output a signal for radiation detection.

Figure 2A:
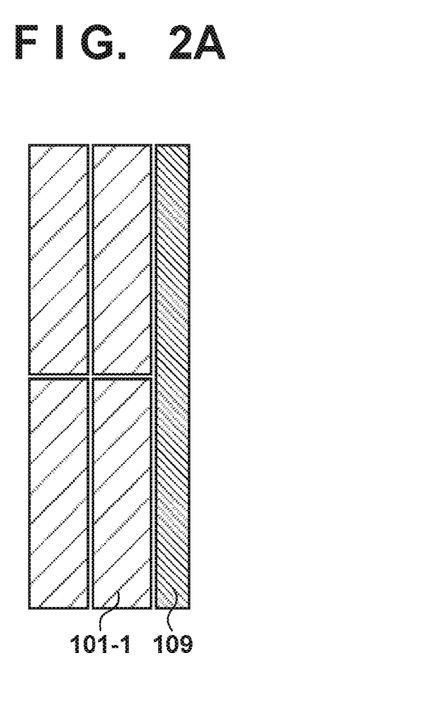
FIGS. 2A and 2B are schematic views showing arrangements of a peripheral member according to the embodiment.
Figure 2B:
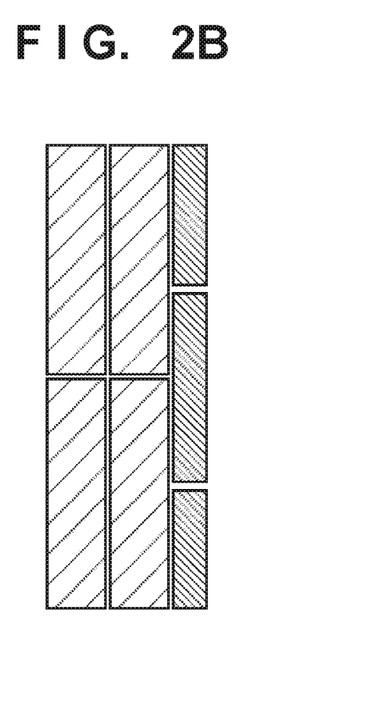

As the method of arranging the peripheral member 109, methods as shown in FIGS. 2A and 2B are usable. The method of arranging the peripheral member 109 is not limited to the method disclosed in this specification as long as a change in the film thickness of the scintillator layer at the edge of the sensor substrate 101 can be suppressed. An example in which the peripheral member 109 is arranged on a periphery of the sensor substrate other than its short side provided with an external connection electrode is shown. FIG. 2A shows an example in which the peripheral member 109 is arranged along a long side of the sensor substrate located at the edge of the sensor panel. The peripheral member 109 is arranged to be adjacent to the sensor substrate 101-1. As will be described later, to form the scintillator layer so as to continuously cover the sensor substrate 101-1 and the peripheral member 109, the peripheral member 109 is arranged in contact with the sensor substrate 101-1. Alternatively, the sensor substrate 101-1 and the peripheral member 109 need only be in contact with each other at such an interval that prevents an abrupt change in the film thickness at the edge of the scintillator layer 107 when forming the scintillator layer 107. For example, the interval between the peripheral member 109 and the edge of the sensor substrate 101-1 need only be 100 μm or less. FIG. 2B shows an example in which the peripheral member 109 is formed from a plurality of members. In this case, the interval between the divided peripheral members 109 is set to 100 μm or less to suppress a change in the film thickness at the edge of the scintillator layer 107.

Figure 3:
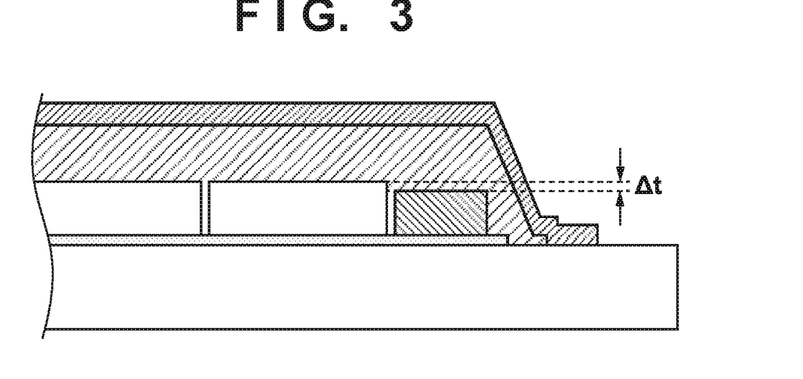
FIG. 3 is a schematic sectional view of an edge of a sensor panel according to the embodiment.

As shown in FIG. 3, a step difference Δt exists between the sensor substrate 101 and the peripheral member 109. The step difference Δt is appropriately set in consideration of the influence on an output image. As will be described later, an abrupt change in the film thickness of the scintillator layer does not occur if the surface of the sensor substrate 101 on which the scintillator layer 107 is formed is higher than the surface of the peripheral member 109 on which the scintillator layer 107 is formed by Δt within the range from 0 μm to 70 μm (both inclusive). When Δt is smaller than 0 μm, that is, the surface of the peripheral member 109 is higher than the surface of the sensor substrate 101, a portion where the scintillator layer is not formed on the sensor substrate 101 may be generated depending on the scintillator layer forming method. For example, a portion where a crystal is not formed due to a height difference may be generated depending on the direction to form the crystal. Even if the crystal is formed, the film thickness of the scintillator layer may decrease at the edge of the sensor substrate 101 adjacent to the peripheral member 109. If the step difference Δt is larger than 70 μm, the thickness of the scintillator layer 107 changes at the edge of the sensor substrate 101, and separation of the scintillator may be caused.

The peripheral member 109 needs to have a certain width to attain a large effect of preventing an abrupt change in the film thickness of the scintillator layer. To prevent an abrupt change in the film thickness of the scintillator layer 107 at the edge of the sensor substrate 101, a width W of the peripheral member in a direction perpendicular to the side surface of the sensor substrate 101 can be set to ⅓ or more of the thickness of the scintillator layer formed in the region of the sensor substrate. The width W of the peripheral member has no upper limit. However, if the peripheral member is too wide, the frame portion of the sensor panel becomes large. In this embodiment, the width W of the peripheral member 109 is set to about 1.5 times the film thickness of the scintillator layer. In this embodiment, the edge of the scintillator layer is formed so as to extend and come into contact with the upper surface of the sensor base 102 made of glass or the like outside the peripheral member 109, as shown in FIG. 1B. As a result, on the sensor panel, the scintillator layer 107 is formed to almost the same thickness up to the edge of the sensor substrate 101. It is therefore possible to suppress a change in the film thickness of the scintillator layer at the edge of the sensor substrate 101.

The scintillator layer 107 on the sensor panel is protected by a scintillator protection layer 108. The scintillator protection layer 108 is placed for the purpose of protecting the scintillator layer 107 from degradation caused by humidity or the like. In particular, when a columnar crystal scintillator such as CsI:Tl is used as the scintillator layer, the scintillator protection layer 108 is provided because the characteristic lowers due to degradation caused by humidity. As for the material of the scintillator protection layer, for example, a general organic sealing material such as a silicone resin, acrylic resin, or epoxy resin, or a hot-melt resin based on polyester, polyolefin, polyamide, or the like is usable. Out of these materials, particularly, a resin with low moisture permeability can be used for the material. For example, an organic film of polyparaxylene formed by CVD (Chemical Vapor Deposition) or a hot-melt resin represented by a polyolefin resin is used.

Additionally, as shown in FIG. 1B, a reflecting layer 112 covers the scintillator protection layer 108. The sensitivity of the sensor panel can be raised by the reflecting layer 112. As the reflecting layer 112, a high-reflectance material such as Al, Ag, or Mg can be used.

To confirm the shape of the scintillator layer, a sectional image of the sensor panel formed in this embodiment was acquired using a SEM (Scanning Electron Microscope). In this embodiment, when the step difference (Δt shown in FIG. 3) between the sensor substrate 101 and the peripheral member 109 was measured, Δt=30 μm. No large structural disorder of the scintillator layer was observed near the boundary between the sensor substrate and the peripheral member, and it was confirmed that the scintillator layer was uniformly formed up to the edge of the sensor substrate. An image acquired using the sensor panel was evaluated. It was consequently confirmed that an excellent image without a steep decrease in sensitivity throughout the imaging region was acquired.

Next, a sensor panel in which the step difference Δt between the sensor substrate and the peripheral member was 70 μm was formed. When a section was observed by the SEM, the scintillator layer was uniformly formed on the sensor substrate even in the case in which the step difference was 70 μm, although a slight structural change was observed at the step portion. Image evaluation was done as in the first embodiment. It was consequently confirmed that an excellent image without a steep decrease in sensitivity throughout the imaging region was acquired. Even in a case in which the surface of the sensor substrate 101 on which the scintillator layer was formed was higher than the surface of the peripheral member 109 on which the scintillator layer was formed by 70 μm, it was confirmed that no abrupt change in the film thickness occurred. When Δt is 0 μm, there is no influence on a change in the thickness of the scintillator layer because there exists no height difference. Hence, it was confirmed that Δt need only fall within the range from 0 μm to 70 μm (both inclusive).

Figure 4A:
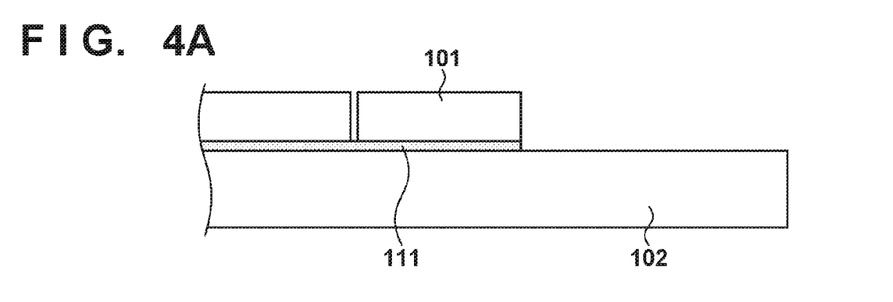
FIGS. 4A to 4D are schematic views showing a method of manufacturing the sensor panel according to the embodiment.
Figure 4B:
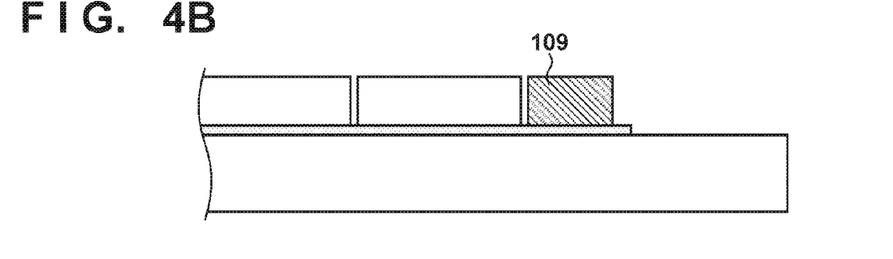
Figure 4C:
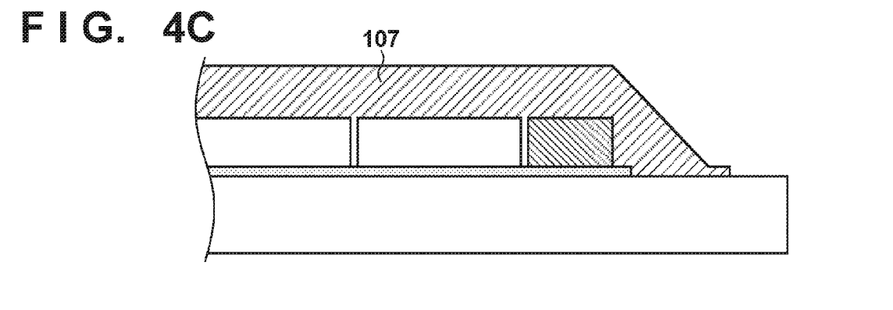

A method of manufacturing the radiation detection apparatus according to the embodiment will be described next with reference to FIGS. 4A to 4D. As shown in FIG. 4A, first, an adhesive layer 111 is formed on the sensor base 102 made of glass or the like and configured to support the sensor substrates, and the sensor substrates 101 are arranged on the adhesive layer 111. In this embodiment, the plurality of rectangular sensor substrates 101 are arranged on the sensor base 102 to form a wide screen sensor panel. Next, as shown in FIG. 4B, the peripheral member 109 is placed on the adhesive layer 111 so as to be adjacent to a long side of the sensor substrate 101 located at the edge of sensor panel. After that, as shown in FIG. 4C, the scintillator layer 107 is formed so as to cover the sensor substrates and the peripheral member. The scintillator layer 107 is formed so as to continuously cover the sensor substrates 101 and the peripheral member 109. As the material of the scintillator, for example, cesium iodide (to be referred to as CsI hereinafter) is used. A small amount of thallium (Tl), sodium (Na), or the like is added to CsI as an activator. The scintillator layer 107 is formed by vacuum deposition, a layer of cesium iodide (CsI) to which thallium (Tl) is added as an activator (to be referred to as CsI:Tl hereinafter).

Figure 4D:
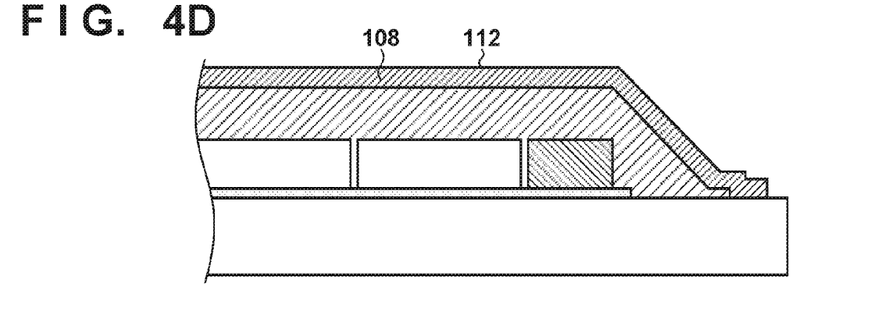

Then, as shown in FIG. 4D, the scintillator protection layer 108 and the reflecting layer 112 that covers the scintillator protection layer 108 are formed. As each of the scintillator protection layer 108 and the reflecting layer 112, an Al (aluminum) sheet can be used. A hot-melt resin made of a polyolefin resin having a thickness of about 100 μm is formed on the Al sheet in advance. The scintillator layer 107 is covered with the Al sheet. At this time, the side on which the hot-melt resin is formed is arranged on the scintillator layer side. The hot-melt resin is melted by hot press and adhered to the scintillator layer 107. With the above processes, the scintillator protection layer 108 and the reflecting layer 112 are formed on the scintillator layer 107. The reflecting layer 112 may be a film, or a composite film to which an organic resin as the scintillator protection layer 108 is applied may be used. When the composite film is used, the scintillator protection layer 108 and the reflecting layer 112 can be formed at once, and therefore, the workload is expected to decrease. In addition, a large moisture-proof effect is expected to be attained by the metal film as the reflecting layer 112. A plate-shaped reflecting plate may be placed on an adhesive layer on the scintillator layer 107 on which the scintillator protection layer 108 is formed. At this time, to enhance the moisture-proof effect, the edge of the plate-shaped reflecting plate is connected to the sensor substrate by a moisture-proof sealing resin. The connection is done by the sealing resin so as to surround the scintillator layer to shield it from the external environment. Finally, an external wiring is connected to an external connection electrode provided on the edge of the CMOS sensor to connect the external wiring to a circuit board on which a signal processing circuit such as a driving circuit/read circuit is arranged. After that, the members are covered with a case or the like, thereby completing the radiation detection apparatus.

Another example of the method of forming the scintillator protection layer and the reflecting layer will be described next. First, the processes up to formation of the scintillator layer 107 are performed in accordance with the method of this embodiment. After that, as the scintillator protection layer, a 20-μm thick polyparaxylene (parylene) film is formed to cover the scintillator layer 107. To form parylene, thermal CVD can be used. Next, an Al plate is placed on CsI as the reflecting layer. At this time, the Al plate is placed on a 25-μm thick adhesive layer on the scintillator layer with parylene. Next, sealing processing is performed. More specifically, the glass base and the Al plate are connected and sealed by an epoxy-based sealing resin. After that, the radiation detection apparatus is formed by the same method as described above. An image obtained using the thus formed sensor panel was evaluated. In this case as well, it was confirmed that an excellent image without a steep decrease in sensitivity throughout the imaging region was acquired.

COMPARATIVE EXAMPLE

Figure 5:
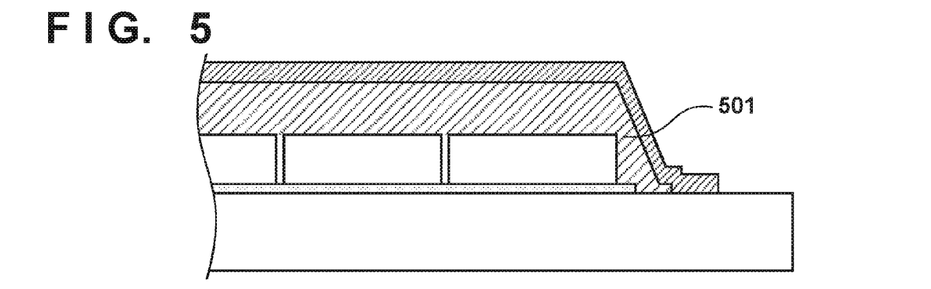
FIG. 5 is a schematic sectional view of a sensor panel according to a comparative example.

In this comparative example, a radiation detection apparatus was formed without arranging the peripheral member, as shown in FIG. 5. The arrangement is the same as that of the first embodiment except that the peripheral member is not arranged at the edge of the CMOS sensor chip. When a sectional image of the edge of the scintillator layer was acquired using an SEM by the same method as in the first embodiment, it was confirmed that the film thickness of the scintillator layer steeply changed at the chip edge, as shown in FIG. 5 (a portion indicated by 501). After a radiation detection apparatus as in the first embodiment was formed, image evaluation was done. A decrease in sensitivity was confirmed in the region where the film thickness of the scintillator layer steeply changed.

<Second Embodiment>

Figure 6:
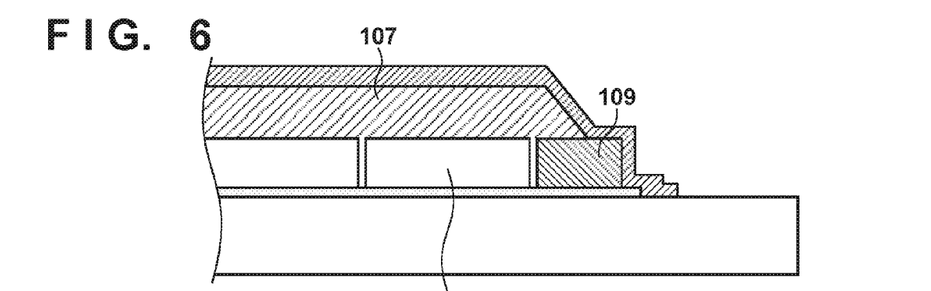
FIG. 6 is a schematic sectional view of a sensor panel according to an embodiment.

In a radiation detection apparatus according to this embodiment, as shown in FIG. 6, a scintillator layer is formed continuously from the upper surface of a sensor substrate 101 to the upper surface of a peripheral member 109. On the peripheral member 109, the edge of a scintillator layer 107 is terminated, and the thickness becomes 0. The distance from the edge of the peripheral member 109 on a side close to the sensor substrate 101 to the portion at which the scintillator layer 107 is terminated is the same as the thickness of the scintillator layer on the sensor substrate. In this embodiment, when observation by an SEM was conducted as in the first embodiment, the thickness of the scintillator layer at a position of the peripheral member 109 close to the sensor substrate was the same as the thickness on the sensor substrate. Image evaluation as in the first embodiment was performed. It was consequently confirmed that an excellent image without a steep decrease in sensitivity throughout the imaging region was acquired.

<Third Embodiment>

Figure 7:
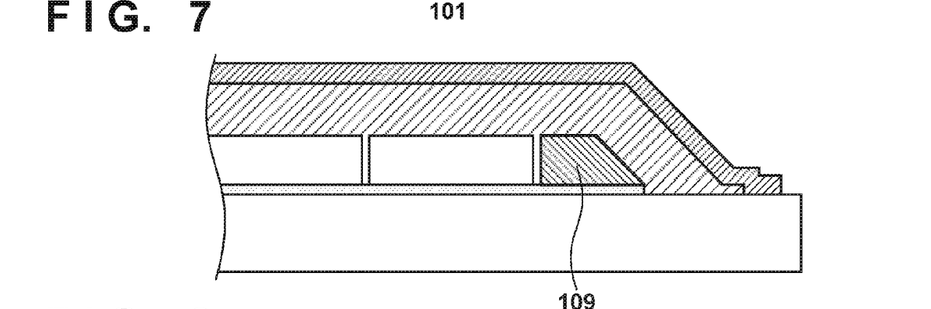
FIG. 7 is a schematic sectional view of a sensor panel according to an embodiment.

In a radiation detection apparatus according to this embodiment, the height of the peripheral member is decreased toward the peripheral portion of the peripheral member. As shown in FIG. 7, the peripheral member is lower on the peripheral side than on the side close to a sensor substrate, and the thickness of the peripheral member is decreased toward the peripheral portion. A section of a thus formed sensor panel was observed by an SEM. The thickness of the scintillator layer continuously formed from the sensor substrate to the peripheral member was uniform on the sensor substrate. A change in the thickness of the scintillator layer was also suppressed. Image evaluation was performed as in the first embodiment. It was consequently confirmed that an excellent image without a steep decrease in sensitivity throughout the imaging region was acquired.

<Fourth Embodiment>

Figure 8:
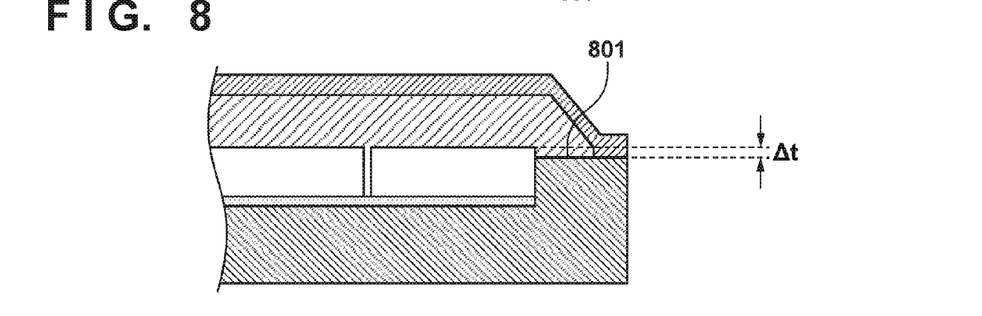
FIG. 8 is a schematic sectional view of a sensor panel according to an embodiment.

In a radiation detection apparatus according to this embodiment, a peripheral member 109 is integrated with a sensor base 102 made of a glass substrate. The rest of the arrangement is the same as in the first embodiment. First, the sensor base 102 having a concave portion as shown in FIG. 8 is prepared. The sensor substrate 101 is supported on an adhesive layer 111 in the concave portion of the sensor base 102. In this embodiment, the edge of the sensor base 102 with a convex portion 801 corresponds to the peripheral member. A step difference Δt between the convex portion 801 and the surface of the sensor substrate was Δt=30 μm. According to the same method as in the first embodiment, a scintillator layer was formed continuously from the sensor substrate to the region of the convex portion 801 at the edge of the sensor base, a scintillator protection layer and a reflecting layer were formed, and wiring connection and the like were performed. Image evaluation was performed for the radiation detection apparatus according to this embodiment as well. It was consequently confirmed that an excellent image without a steep decrease in sensitivity throughout the imaging region was acquired.

<Fifth Embodiment>

Figure 9:
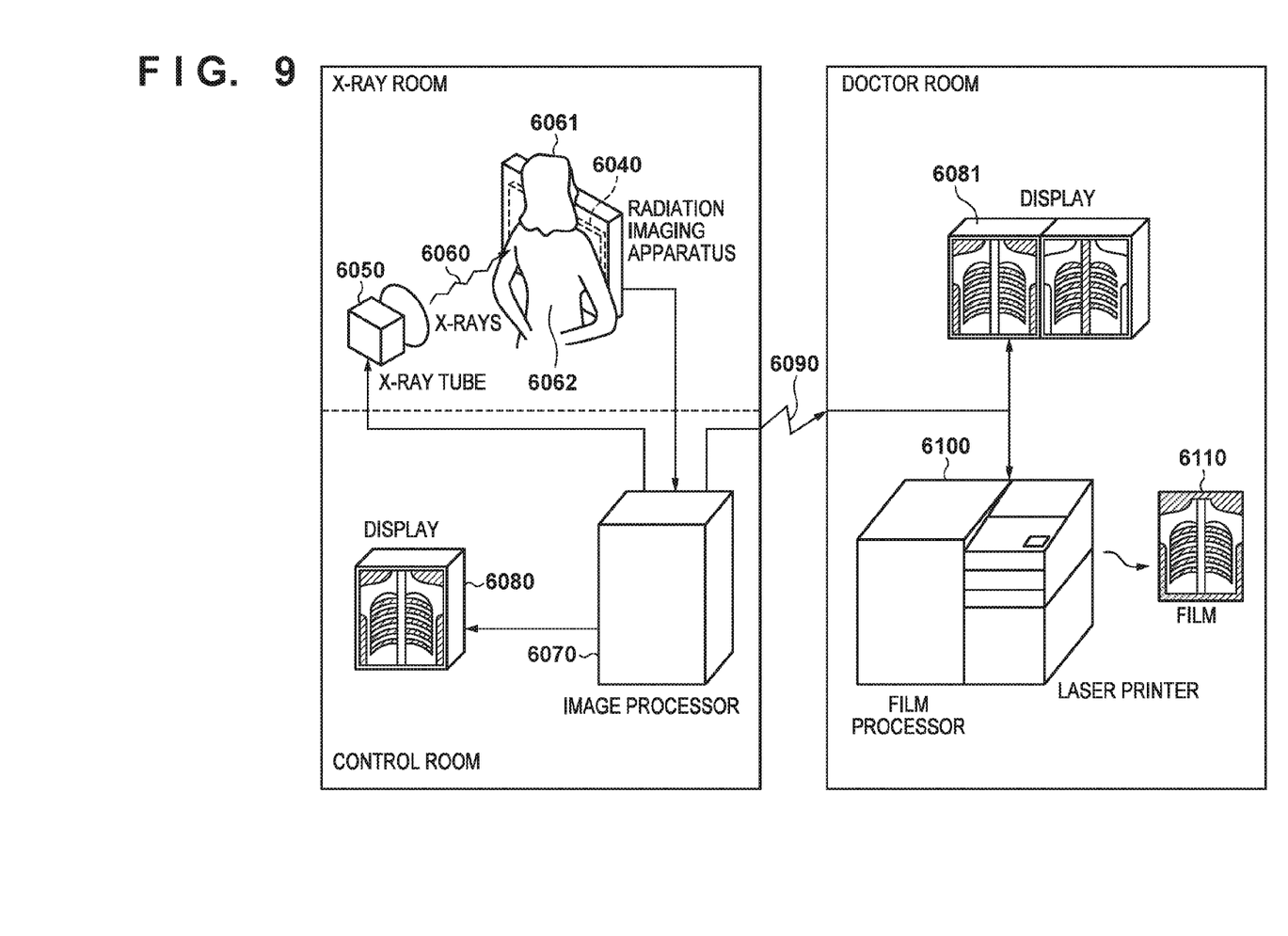
FIG. 9 is a view showing the arrangement of a radiation imaging system according to an embodiment.

In this embodiment, an example in which a radiation detection apparatus according to the present invention is applied to a radiation imaging system will be described. As shown in FIG. 9, X-rays 6060 generated by an X-ray tube 6050 that is a radiation source are transmitted through a chest 6062 of a patient or subject 6061 and enter a radiation detection apparatus 6040. The X-rays that have entered include the internal information of the patient 6061. A scintillator emits light in correspondence with the X-rays that have entered. The light is photoelectrically converted by a photoelectric conversion element of a sensor panel, thereby obtaining electrical information. This information is converted into digital data and processed by an image processor 6070 serving as a signal processing means. The data can be observed on a display 6080 serving as a display means in the control room.

This information can also be transferred to a remote site by a transmission processing means such as a network 6090 such as a telephone, a LAN, or the Internet. The information can also be displayed on a display 6081 in, for example, a doctor room of another place or saved in a recording medium such as an optical disk. Hence, a doctor in the remote site can make a diagnosis. The information can also be recorded in a film 6110 by a film processor 6100 serving as a recording means.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-055354, filed Mar. 18, 2015, which is hereby incorporated by reference herein in its entirety.

What is claimed is:

1. A radiation detection apparatus comprising:
 a sensor base;
 a sensor substrate supported by the sensor base and configured to output signals from a plurality of pixels for radiation detection;
 a peripheral member arranged in a periphery of a side surface of the sensor substrate separately from the sensor substrate, said peripheral member being supported by the sensor base and configured not to output the signal for radiation detection
 a scintillator layer configured to continuously cover the sensor substrate and the peripheral member; and
 a circuit configured to process the signals from the pixels.

2. The apparatus according to claim 1, wherein an electrode for connection is arranged on at least one side of the sensor substrate, and
 the peripheral member is arranged along a side of the sensor substrate where the electrode is not arranged.

3. The apparatus according to claim 2, wherein a plurality of sensor substrates are supported by the sensor base.

4. The apparatus according to claim 3, wherein the sensor substrate has a rectangular outer shape, and the side where the electrode is not arranged is a long side of the sensor substrate.

5. The apparatus according to claim 4, wherein the plurality of sensor substrates supported by the sensor base are arranged such that a long side and a long side are adjacent, and a short side and a short side are adjacent, and
 the number of sensor substrates arranged in a direction along the short side is larger than the number of sensor substrates arranged in a direction along the long side.

6. The apparatus according to claim 4, wherein the peripheral member is arranged along a long side of a sensor substrate which is arranged at the end of the plurality of sensor substrates.

7. The apparatus according to claim 1, wherein a thickness of the sensor substrate is not less than a thickness of the peripheral member.

8. The apparatus according to claim 7, wherein a thickness of a first portion of the peripheral member is larger than a thickness of a second portion of the peripheral member, and
 the first portion of the peripheral member is closer to the side surface of the sensor substrate than the second portion of the peripheral member.

9. The apparatus according to claim 7, wherein a thickness of the scintillator layer that covers the peripheral member decreases from a first portion of the scintillator layer to a second portion of the scintillator layer,
 the first portion of the scintillator layer is closer to the side surface of the sensor substrate than the second portion of the scintillator layer, and
 the second portion of the scintillator layer is closer to a peripheral portion of the peripheral member than the first portion of the scintillator layer.

10. The apparatus according to claim 1, wherein the scintillator layer includes a columnar crystal scintillator, and
 the columnar crystal scintillator is at least partially in contact with the peripheral member.

11. A radiation imaging apparatus comprising:
 the radiation detection apparatus defined in claim 1; and
 a radiation source configured to generate radiation.

12. A method of manufacturing a radiation detection apparatus comprising:
 placing a sensor substrate on a sensor base;
 arranging a peripheral member separately from the sensor substrate so that a side surface of the peripheral member is opposite to a side surface of the sensor substrate, said peripheral member being configured not to output a signal for radiation detection; and
 forming a scintillator layer so as to continuously cover the sensor substrate and the peripheral member.

13. The method according to claim 12, wherein an electrode for connection is arranged on at least one side of the sensor substrate, and
 the peripheral member is placed on the sensor base along a side of the sensor substrate where the electrode is not arranged.

14. The method according to claim 13, wherein a plurality of sensor substrates are placed on the sensor base.

15. The method according to claim 14, wherein the sensor substrate has a rectangular outer shape, and the side where the electrode is not arranged is a long side of the sensor substrate.

16. The method according to claim 15, wherein the plurality of sensor substrates supported by the sensor base are placed such that a long side and a long side are adjacent, and a short side and a short side are adjacent, and the number of sensor substrates placed in a direction along the short side is larger than the number of sensor substrates placed in a direction along the long side.

17. The method according to claim 12, wherein the scintillator layer is formed such that a thickness of the scintillator layer that covers the peripheral member decreases from a portion close to the side surface of the sensor substrate to a peripheral portion of the peripheral member.

18. The method according to claim 12, wherein the scintillator layer includes a columnar crystal, and the scintillator layer is formed by a deposition method so as to continuously cover the sensor substrate and the peripheral member.

19. A radiation detection apparatus comprising:

a sensor base;

a sensor substrate supported by the sensor base and configured to output signals from a plurality of pixels for radiation detection;

a peripheral member supported by the sensor base, said peripheral member being arranged separately from the sensor substrate in a periphery of a side surface of the sensor substrate so that a side surface of the peripheral member is opposite to the side surface of the sensor substrate, and said peripheral member being configured not to output the signal for radiation detection; and a scintillator layer configured to continuously cover the sensor substrate and the peripheral member.

20. The apparatus according to claim 19, wherein the peripheral member is a convex portion of the sensor base.

21. A radiation imaging apparatus comprising:

the radiation detection apparatus according to claim 19; and a radiation source configured to generate radiation.

* * * * *